US010074279B1

(12) United States Patent
Xu et al.

(10) Patent No.: US 10,074,279 B1
(45) Date of Patent: Sep. 11, 2018

(54) INFERENCE-AWARE MOTION PLANNING (71) Applicants: Denso International America, Inc., Southfield, MI (US); DENSO CORPORATION, Kariya, Aichi-pref. (JP)

(72) Inventors: Yunfei Xu, Milpitas, CA (US); Takashi Bando, Mountain View, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/451,957

(22) Filed: Mar. 7, 2017

(51) Int. Cl.
  G08G 1/00 (2006.01)
  G08G 1/16 (2006.01)
  B60W 10/20 (2006.01)
  B60W 10/18 (2012.01)
  B60W 30/095 (2012.01)
  (Continued)

(52) U.S. Cl.
  CPC ............ G08G 1/16 (2013.01); B60W 10/04 (2013.01); B60W 10/18 (2013.01); B60W 10/20 (2013.01); B60W 30/095 (2013.01); B60W 40/04 (2013.01); B60W 40/12 (2013.01); G05D 1/0088 (2013.01); G05D 1/0278 (2013.01); G08G 1/166 (2013.01); G08G 1/167 (2013.01); G08G 1/168 (2013.01);
  (Continued)

(58) Field of Classification Search
  CPC .......... G08G 1/16; G08G 1/166; G08G 1/167; G08G 1/168; B60W 10/04; B60W 10/18; B60W 10/20; B60W 30/095; B60W 40/04; B60W 40/12; B60W 2420/42; B60W 2420/52; B60W 2420/54; B60W 2750/306; G05D 1/0088; G05D 1/0278
  USPC ............................ 701/25, 301; 340/435, 436
  See application file for complete search history.

(56) References Cited

U.S. PATENT DOCUMENTS 7,734,387 B1  6/2010  Young et al.
8,392,117 B2  3/2013  Dolgov et al.
  (Continued)

OTHER PUBLICATIONS

U.S. Appl. No. 15/359,651, filed Nov. 23, 2016, Denso International America, Inc.
  (Continued)

Primary Examiner — Marthe Y Marc-Coleman
(74) Attorney, Agent, or Firm — Harness, Dickey & Pierce, P.L.C.

(57) ABSTRACT

A system and method are provided and include a subject vehicle having vehicle actuation systems and vehicle sensors. A planning system includes a global route planner module, an inference module, a motion planner module, and a trajectory follower module. The inference module receives a route from the global route planner module and dynamic obstacles data from a perception system and determines a total cost for different sets of motions associated with different trajectories for traveling along the received route. The total cost includes an inferred cost based on a probability of the associated set of motions having an increased or decreased cost based on the dynamic obstacles data. The motion planner selects a particular set of motions based on the total costs and generates a smooth trajectory for the vehicle. The trajectory follower module controls the vehicle actuation systems based on the smooth trajectory.

19 Claims, 6 Drawing Sheets

(51) Int. Cl.
*B60W 10/04* (2006.01)
*B60W 40/12* (2012.01)
*B60W 40/04* (2006.01)
*G05D 1/00* (2006.01)
*G05D 1/02* (2006.01)

(52) U.S. Cl.
CPC ..... *B60W 2420/42* (2013.01); *B60W 2420/52* (2013.01); *B60W 2420/54* (2013.01); *B60W 2750/306* (2013.01)

(56) References Cited

U.S. PATENT DOCUMENTS

| | | | |
|---|---|---|---|
| 8,634,980 B1 | 1/2014 | Urmson et al. | |
| 9,008,890 B1 | 4/2015 | Herbach et al. | |
| 9,760,092 B2 * | 9/2017 | Ferguson | G05D 1/0231 |
| 2005/0216182 A1 * | 9/2005 | Hussain | G01C 21/20 |
| | | | 701/532 |

OTHER PUBLICATIONS

"Sequence Prediction of Driving Behavior Using Double Articulation Analyzer," Taniguchi et al., IEEE, 2015.
"Probabilistic planning with clear preferences on missing information," Likhachev et al., Artificial Intelligence, 2008.
"Probabilistic Planning with Clear Preferences on Missing Information," Likhachev et al., University of Pennsylvania Scholarly Commons, 2008.

* cited by examiner

INFERENCE-AWARE MOTION PLANNING

FIELD

The present disclosure relates to systems and methods for inference-aware motion planning for automated driving of a vehicle.

BACKGROUND

This section provides background information related to the present disclosure, which is not necessarily prior art.

Motion planning is important for autonomous or self-driving vehicles to provide a collision-free path from a vehicle's current location to its destination. Existing motion planning systems make use of direct information from perception system outputs, such as estimates of location and speed of traffic participants, estimates of road boundaries, etc. This information, combined with a predefined vehicle model, motion primitives, and traffic rules, can be used by the motion planning system to generate an optimal trajectory for the vehicle to follow.

Existing motion planning systems, however, do not account for the implications and inferences about the environment outside of the directly perceived information about the environment and are subject to improvement.

SUMMARY

This section provides a general summary of the disclosure, and is not a comprehensive disclosure of its full scope or all of its features.

The present teachings include systems and methods for inference-aware motion planning for automated driving of a vehicle.

The present teachings include a system comprising a vehicle having at least one vehicle actuation system and at least one vehicle sensor. the at least one vehicle actuation system includes at least one of a steering system, a braking system, and a throttle system, and the at least one vehicle sensor including at least one of a vehicle speed sensor, a vehicle acceleration sensor, an image sensor, a Lidar sensor, a radar sensor, a stereo sensor, an ultrasonic sensor, a global positioning system, and an inertial measurement unit. The system also includes a perception system that generates dynamic obstacles data based on information received from the at least one vehicle sensor, the dynamic obstacles data including at least one of a current location, a size, a current estimated trajectory, a current estimated velocity, and a current estimated acceleration/deceleration of an object. The system also includes a planning system having a global route planner module, an inference module, a motion planner module, and a trajectory follower module. The global route planner module receives an inputted destination and generates a route to the inputted destination. The inference module receives the route from the global route planner module and the dynamic obstacles data from the perception system and determines a total cost for each set of motions of a plurality of sets of motions associated with different trajectories for traveling along the received route. The total cost includes at least one associated cost and an inferred cost for the associated set of motions, the inferred cost being based on a probability of the associated set of motions having an increased or decreased cost based on the dynamic obstacles data. The motion planner module receives the total cost for each set of motions of the plurality of sets of motions, selects a particular set of motions from the plurality of sets of motions based on the total cost for each set of motions, and generates a smooth trajectory for the vehicle. The trajectory follower module controls the at least one vehicle actuation system based on the smooth trajectory.

The present teachings also include a method comprising receiving, with a global route planner module of a planning system of a vehicle, an inputted destination. The vehicle has at least one vehicle actuation system and at least one vehicle sensor. The at least one vehicle actuation system includes at least one of a steering system, a braking system, and a throttle system and the at least one vehicle sensor includes at least one of a vehicle speed sensor, a vehicle acceleration sensor, an image sensor, a Lidar sensor, a radar sensor, a stereo sensor, an ultrasonic sensor, a global positioning system, and an inertial measurement unit. The method also includes generating, with the global route planner module, a route to the inputted destination. The method also includes generating, with a perception system, dynamic obstacles data based on information received from the at least one vehicle sensor, the dynamic obstacles data including at least one of a current location, a size, a current estimated trajectory, a current estimated velocity, and a current estimated acceleration/deceleration of an object. The method also includes receiving, with an inference module of the planning system, the route from the global route planner module and the dynamic obstacles data from the perception system. The method also includes determining, with the inference module, a total cost for each set of motions of a plurality of sets of motions associated with different trajectories for traveling along the received route, the total cost including at least one associated cost and an inferred cost, the inferred cost being based on a probability of the set of motions having an increased or decreased cost based on the dynamic obstacles data. The method also includes receiving, with a motion planner module of the planning system, the total cost for each set of motions. The method also includes selecting, with the motion planner module, a particular set of motions from the plurality of sets of motions based on the total cost for each set of motions. The method also includes generating, with the motion planner module, a smooth trajectory for the vehicle based on the particular set of motions. The method also includes controlling, with a trajectory follower module of the planning system, the at least one vehicle actuation system based on the smooth trajectory.

The present teachings include a system comprising a vehicle having a plurality of vehicle actuation systems and a plurality of vehicle sensors. The plurality of vehicle actuation systems includes a steering system, a braking system, and a throttle system and the plurality of vehicle sensors includes a global positioning system and inertial measurement unit and at least one of a vehicle speed sensor, a vehicle acceleration sensor, an image sensor, a Lidar sensor, a radar sensor, a stereo sensor, and an ultrasonic sensor. The system also includes a map database storing map data for a geographic area in which the vehicle is traveling. The system also includes a vehicle information database storing vehicle information indicating at least one of a vehicle model, a vehicle size, a vehicle wheelbase, a vehicle mass, and a vehicle turning radius of the vehicle. The system also includes a motion primitive database storing a listing of motion primitives, each corresponding to a discretized smooth path that can be traversed by the vehicle over a predetermined time interval. The system also includes a traffic rules database storing traffic rules associated with the geographic area in which the vehicle is traveling. The system also includes a communication system configured to communicate with at least one other vehicle and receive information related to at least one of a warning of an accident, a driving hazard, an obstacle, a traffic pattern, a location of the at least one other vehicle, a traffic signal location, and a traffic signal timing. The system also includes a perception system configured to generate dynamic obstacles data, static obstacles data, and road geometry data based on information received from the plurality of vehicle sensors, the dynamic obstacles data including at least one of a current location, a size, a current estimated trajectory, a current estimated velocity, and a current estimated acceleration/deceleration of an object, the static obstacles data including information about static obstacles, and the road geometry data including information about a road that the vehicle is traveling on. The system also includes a planning system having a global route planner module, an inference module, a motion planner module, and a trajectory follower module. The global route planner module receives an inputted destination and generates a route to the inputted destination based on the map data from the map database and based on traffic information from the global positioning system and inertial measurement unit. The perception system generates localization/inertial data corresponding to a current location and orientation of the vehicle based on information received from the plurality of vehicle sensors. The inference module receives the route from the global route planner module, the dynamic obstacles data from the perception system, and the information from the communication system, and determines a total cost for each set of motions of a plurality of sets of motions associated with different trajectories for traveling along the route based on at least one associated cost and an inferred cost for each set of motions, the inferred cost being based on a probability of the associated set of motions having an increased or decreased cost based on the dynamic obstacles data and based on the information from the communication system. The planning system (i) receives the total cost for each set of motions of the plurality of motions, the map data from the map database, the vehicle information from the vehicle information database, the listing of motion primitives from the motion primitive database, the traffic rules from the traffic rules database, the information from the communication system, the dynamic obstacles data from the perception system, the static obstacles data from the perception system, the road geometry data from the perception system, and localization/inertial data from the perception system, (ii) selects a particular set of motions from the plurality of sets of motions based on the total cost for each set of motions, and (iii) generates a smooth trajectory for the vehicle based on the particular set of motions. The trajectory follower module controls the plurality of vehicle actuation system based on the smooth trajectory.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To address the above issues with conventional approaches, the present teachings include an inference-aware motion planning system that receives dynamic information about the surrounding environment of an autonomous or self-driving vehicle, including dynamically changing information about moving and/or moveable objects, such as other vehicles, pedestrians, obstacles, etc., and adjusts the total cost associated with different possible sets of motions associated with different trajectories for traveling along a route path based on calculated probabilities that the dynamic information is indicating an increased or decreased cost of the individual sets of motions associated with the different trajectories. For example, a route determined by a global route planner may include a number of different ways to arrive at a destination. For example, the route may include a road with multiple lanes. As discussed in further detail below, the associated cost for different sets of motions associated with the different trajectories (such as, for example, traveling in the current lane, changing lanes to the left, changing lanes to the right, changing lanes to the left, etc.) may include a value corresponding to the cost-to-goal for the associated set of motions, a value corresponding to the sum of all action-costs for the set of motions, a value corresponding to a collision-cost for the associated set of motions, etc. An inference module may account for the implications of the dynamic information by adjusting a total cost of a particular set of motions associated with a particular trajectory based on the dynamic information and, more specifically, based on probability that the dynamic information is indicating an increased or decreased cost for the associated set of motions due to, for example, an object lying in one of the roadway lanes, traffic being faster or slower in one of the roadway lanes, etc.

For example, as discussed in further detail below, if the dynamic information indicates that a vehicle traveling in the same lane ahead of the self-driving vehicle changes lanes to the left, this dynamic information (i.e., that the preceding vehicle changed lanes) could infer or imply that there is an obstacle (such as a tire, debris, a disabled vehicle, an animal, etc.) located in the self-driving vehicle's current lane. In such case, the inference module may increase the cost associated with the staying in the current lane of traffic. For further example, if the dynamic information indicates that a second vehicle traveling in the same lane ahead of the self-driving vehicle also changes lanes to the left, the inference module may again increase the cost associated with the current lane of traffic based on the increased probability that there is an obstacle located in the self-driving vehicle's current lane. Based on the increased cost associated with staying in the current lane of traffic, the self-driving vehicle may then change lanes due to the set of motions for changing lanes having a lower associated cost than the set of motions for staying in the current lane of traffic. For example, similar to the preceding vehicles, the self-driving vehicle may change lanes to the left and may ultimately avoid an obstacle located in the self-driving vehicle's current lane despite not having directly observed or sensed the obstacle with a perception system of the self-driving vehicle. In this way, the inference-aware motion planning system may result in more human-like driving behavior of the self-driving vehicle.

Figure 1:
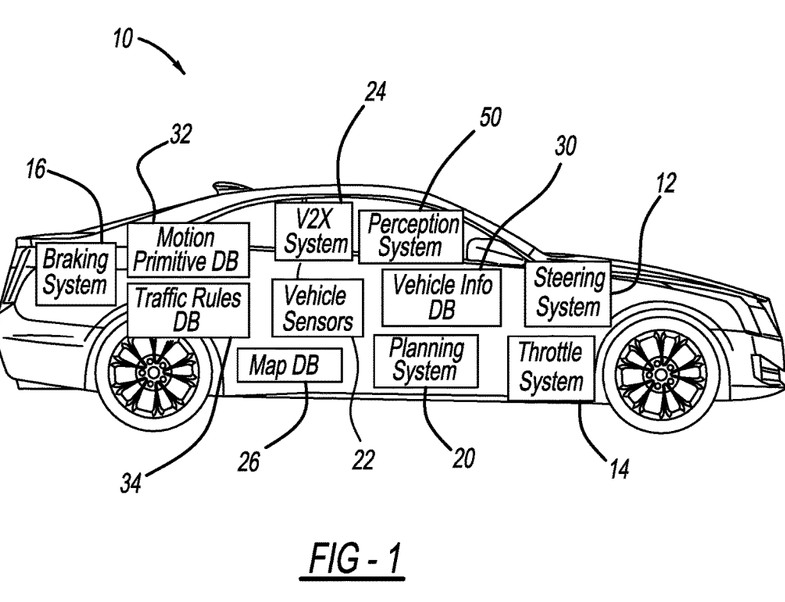
FIG. 1 illustrates a subject vehicle with a system for inference-aware motion planning according to the present teachings.

With reference to FIG. 1, a self-driving vehicle 10 is illustrated. Although the self-driving vehicle 10 is illustrated as an automobile in FIG. 1, the present teachings apply to any other suitable vehicle, such as a sport utility vehicle (SUV), a mass transit vehicle (such as a bus), or a military vehicle, as examples. The self-driving vehicle 10 includes a steering system 12 for steering the self-driving vehicle 10, a throttle system 14 for accelerating and propelling the self-driving vehicle 10, and a braking system 16 for decelerating and stopping the self-driving vehicle 10. With additional reference to FIG. 2, the steering system 12, the throttle system 14, and the braking system 16 are grouped as vehicle actuation systems 66. As discussed in further detail below, the vehicle actuation systems 66, including the steering system 12, the throttle system 14, and the braking system 16, can be operated by a trajectory follower module 62 of a planning system 20 to drive the self-driving vehicle 10. As discussed in further detail below, the planning system 20 determines an optimal smooth trajectory for the self-driving vehicle 10 based on input from a perception system 50.

Figure 2:
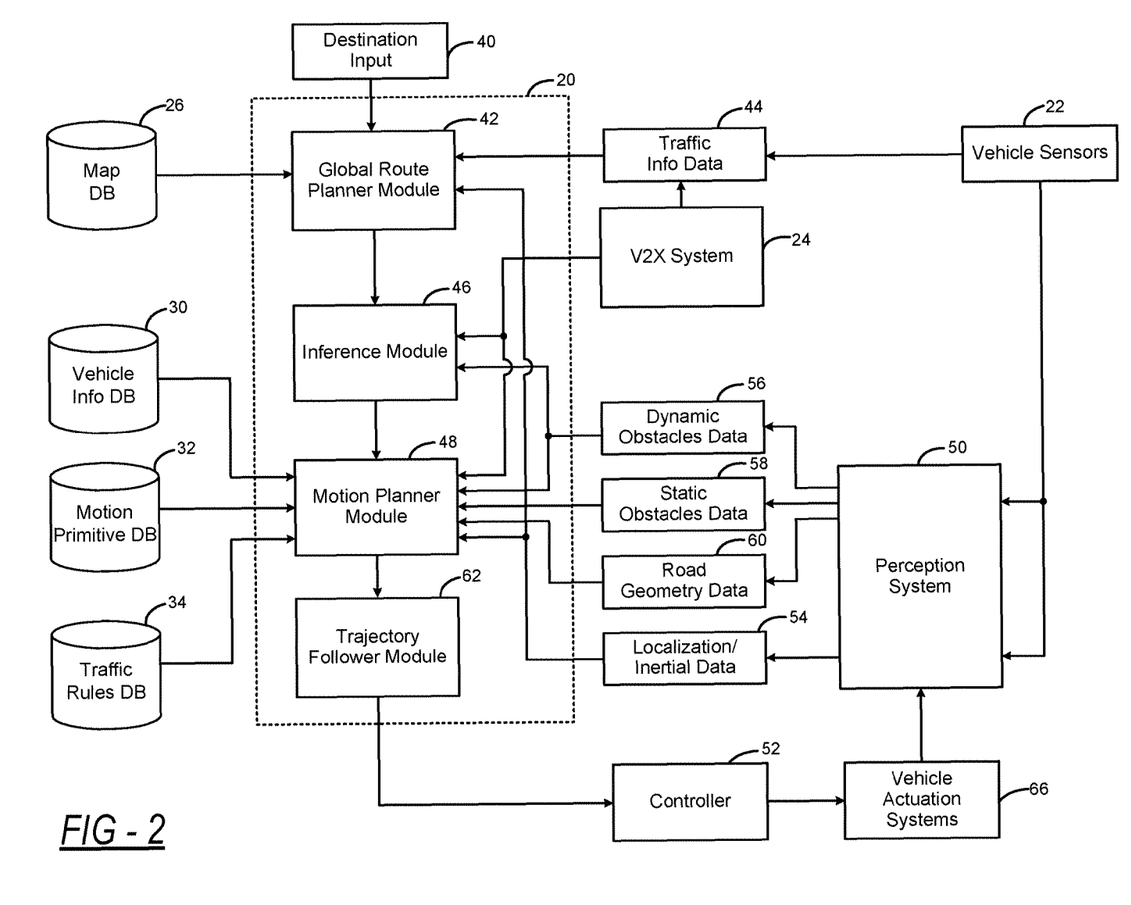
FIG. 2 illustrates a block diagram of the system for inference-aware motion planning according to the present teachings.

With reference to FIGS. 1 and 2, the self-driving vehicle 10 includes vehicle sensors 22, which can include a global positioning system GPS (GPS) and inertial measurement unit (GPS/IMU) that determines location and inertial/orientation data of the self-driving vehicle 10. The vehicle sensors 22 can also include a vehicle speed sensor that generates data indicating a current speed of the self-driving vehicle 10 and a vehicle acceleration sensor that generates data indicating a current rate of acceleration or deceleration of the self-driving vehicle 10.

The vehicle sensors 22 of the self-driving vehicle 10 may also include a number of environmental sensors to sense information about the surroundings of the self-driving vehicle 10. For example, the vehicle sensors 22 may include an image sensor, such as a camera, mounted to a roof of the self-driving vehicle 10. The self-driving vehicle 10 may be equipped with additional image sensors at other locations on or around the self-driving vehicle 10. Additionally, the self-driving vehicle 10 may be equipped with one or more front sensors located near a front bumper of the self-driving vehicle 10, one or more side sensors located on side mirrors or side doors of the self-driving vehicle 10, and/or one or more rear sensors located on a rear bumper of the self-driving vehicle 10. The front sensors, side sensors, and rear sensors may be, for example, image sensors (i.e., cameras), Lidar sensors, stereo sensors, radar sensors, ultrasonic sensors, or other sensors for detecting information about the surroundings of the self-driving vehicle 10, including, for example, other vehicles, lane lines, guard rails, objects in the roadway, buildings, pedestrians, etc., Additional environmental sensors may be located on or around the self-driving vehicle 10. The vehicle sensors 22 may also include sensors to determine the light level of the environment (i.e., whether it is daytime or nighttime), to determine or receive weather data (i.e., whether it is a sunny day, raining, cloudy, etc.), to determine the current temperature, to determine the road surface status (i.e., dry, wet, frozen, number of lanes, types of lane marks, concrete surface, asphalt surface, etc.), to determine traffic conditions for the current path or route of the self-driving vehicle 10, and/or other applicable environmental information. The perception system 50 receives data about the surroundings of the self-driving vehicle 10 from the vehicle sensors 22 and uses the received data to generate environmental data used by the planning system 20 to determine a trajectory for driving the self-driving vehicle 10, as discussed in further detail below. Additionally, the perception system 50 can determine localization data for the self-driving vehicle 10 based on image data collected from cameras, Lidar sensors, stereo sensors, radar sensors, ultrasonic sensors, or other sensors of the self-driving vehicle 10. For example, the GPS/IMU may determine a location of the self-driving vehicle 10 but may not provide sufficient specificity to determine the exact orientation, position, and specific location of the self-driving vehicle 10 at that GPS location. The perception system 50 can determine localization data, including an exact orientation, position, and specific location, for the self-driving vehicle 10 based on the GPS/IMU data from the GPS/IMU and based on environmental data received from the other vehicle sensors 22, such as the cameras, Lidar sensors, stereo sensors, radar sensors, ultrasonic sensors, other sensors, etc.

The self-driving vehicle 10 may optionally include a vehicle-to-vehicle and vehicle-to-infrastructure (collectively referred to as V2X) system 24 capable of dedicated short range communication with other vehicles and with infrastructure (such as a cloud computing device, a building, traffic signals, etc.) locations that are also equipped with V2X communication systems. For example, the V2X system 24 may be configured to transmit and receive signals representing, for example, early warnings of accidents, driving hazards, obstacles ahead, traffic patterns, vehicle locations, traffic signal locations and timing, etc. to/from remote vehicles that are also equipped with V2X systems and/or to/from infrastructure communication locations equipped with a V2X system.

The self-driving vehicle 10 also includes a map database 26, a vehicle information database 30, a motion primitive database 32, and a traffic rules database 34. The map database 26 includes map data for a geographic area in which the self-driving vehicle 10 is traveling. The vehicle information database 30 includes data associated with the self-driving vehicle 10, such as the vehicle model, size, wheelbase, mass, turning radius, etc. The motion primitive database 32 includes a listing of possible motion primitives, which are discrete smooth paths that can be traversed by the self-driving vehicle 10 over a short discrete time interval. The traffic rules database 34 includes traffic rules data indicating a listing of traffic rules (e.g., rules with respect to speed limits, rules with respect to the turns and/or maneuvers that are allowed or prohibited, etc.,) associated with the area in which the self-driving vehicle 10 is traveling.

With reference to FIG. 2, certain components of the self-driving vehicle 10 are shown, along with additional details of the planning system 20. In FIG. 2, for reference, the steering system 12, the throttle system 14, and the braking system 16 are grouped as vehicle actuation systems 66. For further reference, similar to FIG. 1, the various sensors discussed above are shown as vehicle sensors 22. As shown in FIG. 2, the planning system 20 is in communication with and receives data from the map database 26, the vehicle information database 30, the motion primitive database 32, and the traffic rules database 34. If the self-driving vehicle 10 includes a V2X system 24, the planning system 20 is also in communication with the V2X system 24.

As shown in FIG. 2, the planning system 20 includes a global route planner module 42, an inference module 46, a motion planner module 48, and a trajectory follower module 62. As discussed in further detail below, the planning system 20 receives dynamic obstacles data 56, static obstacles data 58, road geometry data 60, and localization/inertial data 54 from the perception system 50.

The global route planner module 42, for example, receives destination input 40 indicating a destination location for the self-driving vehicle 10. The destination input 40 can be received via voice or text input from an operator of the self-driving vehicle 10 or can be received remotely from a remote computing device. The global route planner module 42 can receive traffic information data 44 from the vehicle sensors, such as from a GPS or other communication system. The traffic information data 44 may include data indicating traffic conditions in the geographic area of the self-driving vehicle 10 and indicating traffic conditions along one or more routes from the current location of the self-driving vehicle 10 to the inputted destination. Additionally or alternatively, if the self-driving vehicle 10 includes a V2X system 24, the global route planner module 42 may receive the traffic information data 44 from the V2X system 24 based on communication with other vehicles, a cloud computing device, and/or infrastructure locations that are also equipped with a V2X system. The global route planner module 42 also receives map data about the surroundings of the self-driving vehicle 10 and about various possible routes from the current location of the self-driving vehicle to the inputted destination from the map database 26. Additionally or alternatively, the global route planner module 42 can receive the map data from a remote computing device in communication with the planning system 20.

The global route planner module 42 can receive current localization/inertial data 54 of the self-driving vehicle 10 from the perception system 50. The localization/inertial data 54 may include, for example, a current position of the self-driving vehicle 10 within the surrounding environment, as well as a direction, a velocity, and/or an acceleration or deceleration in the current direction. For example, the perception system 50 can determine or estimate a current state of the self-driving vehicle 10, including localization/inertial data 54, based on data from the vehicle actuation systems 66 and/or the vehicle sensors 22 of the self-driving vehicle 10. For example, the perception system 50 can determine and/or receive location and inertial data indicated by the GPS/IMU, the current steering angle indicated by the steering system 12, the current position of the throttle indicated by the throttle system 14, the current position of the brake indicated by the braking system 16, the current speed of the vehicle indicated by the vehicle speed sensor, and/or the current acceleration/deceleration of the vehicle indicated by the vehicle acceleration sensor. Based on the data received from the vehicle sensors 22 and the vehicle actuation systems 66, the perception system 50 can generate and output the localization/inertial data 54 to the planning system 20, including the global route planner module 42 of the planning system 20.

The global route planner module 42 can determine a route to the inputted destination based on the current location of the self-driving vehicle 10 as indicated by the localization/inertial data 54, based on the map data from the map database 26, and based on the traffic information data 44. The global route planner module 42, for example, can use conventional route planning to determine and output the route to the inputted destination, including a series of route segments for the self-driving vehicle 10 to follow and any potential alternative route segments. For example, the global route planner module 42 may determine a shortest distance route to the inputted destination from the current location or a shortest time of travel to the inputted destination from the current location and can output one or more series of road segments.

In a traditional motion planning system, the route from the global route planner module 42 is outputted to a traditional motion planner module. The traditional motion planner module then outputs a feasible trajectory for the vehicle to follow, based on the route from the global route planner module and based on information about the vehicle and directly sensed data about the vehicle's surroundings.

In the inference-aware motion planning system of the present teachings, however, the route from the global route planner module 42 is instead inputted to an inference module 46 that receives dynamic information about the surroundings of the vehicles and can selectively adjust one or more costs for the different sets of possible motions associated with the different trajectories for traveling along the route based on the dynamic information about the surroundings of the vehicle. For example, the inference module 46 can receive dynamic obstacles data 56 from the perception system 50, which receives data from the vehicle sensors 22, including, for example, the vehicle speed sensor, the vehicle acceleration sensor, the image sensor(s), front sensor(s), the side sensor(s), and/or the rear sensor(s), etc. Based on the data from the vehicle sensors 22, the perception system 50 determines information about the surroundings of the self-driving vehicle 10. As shown in FIG. 2, based on data from the vehicle sensors 22, the perception system 50 can output dynamic obstacles data 56 corresponding to information about dynamic (i.e., moving and/or movable) objects in the surrounding area of the self-driving vehicle 10. The dynamic obstacles data 56, for example, may include data indicating a current location, a size, a current estimated trajectory, a current estimated velocity, and/or a current estimated acceleration/deceleration of the dynamic object, etc. For further example, the dynamic obstacles data may include data about surrounding vehicles, pedestrians, animals, moveable objects in or around the roadway, etc. The perception system 50 can also determine static obstacles data 58, including information, such as location and size of non-moveable objects, such as guardrails, dividers, barriers, medians, light poles, buildings, etc. The perception system 50 can also determine road geometry data 60 indicating information about the roadway, such as the location and type of lane lines, shoulders, etc. of the roadway.

If a V2X system 24 is present in the self-driving vehicle 10, the inference module 46 can also receive information from the V2X system 24 about dynamic objects and/or conditions in the surrounding area of the self-driving vehicle. For example, as discussed above, the V2X system 24 can communicate data about early warnings of accidents, driving hazards, obstacles ahead, traffic patterns, vehicle locations, traffic signal locations and timing, etc. to/from remote vehicles that are also equipped with V2X systems, a cloud computing device, and/or to/from infrastructure communication locations equipped with a V2X system.

Based on the dynamic obstacles data 56 from perception system 50 and data from the V2X system 24 (if present), the inference module 46 can selectively adjust one or more costs for different sets of motions (such as, for example, traveling in the current lane, changing lanes to the left, changing lanes to the right, changing lanes to the left, etc.) for different trajectories along the route received from the global route planner module 42. For example, a particular set of motions associated with a particular trajectory for traveling along the route received from the global route planner module 42 may have: (i) an associated cost-to-goal; (ii) one or more associated motion-costs; and/or (iii) an associated collision-cost.

The associated cost-to-goal corresponds to the designated cost from a current or local location to the destination location. For example, for any two sets of motions associated with two trajectories for traveling along the route, a set of motions that has a higher distance to the destination location may have a higher associated cost-to-goal. Additionally or alternatively, for any two particular sets of motions associated with two trajectories for traveling along the route, a set of motions that has a longer estimated travel time to the destination location may have a higher associated cost-to-goal. The cost-to-goal metric can be selected to place relatively more or less emphasis or weight on distance or on travel time.

The one or more associated motion-costs include the cost of executing motion commands associated with the particular set of motions. For example, frequently changing lanes may require multiple motions for the vehicle and should be avoided. As such, a set of motions that includes changing lanes may have a higher motion-cost than a comparable set of motions that does not require changing lanes, with all other things being equal. Likewise, frequently applying the brakes may require multiple braking motions and should be avoided. As such, a set of motions that includes increased braking will have a higher motion-cost than a comparable set of motions that does not require increased braking. Additionally, traveling at a speed that is greater than the associated speed limit for the particular road should not occur and, as a result, any set of motions that includes traveling at a speed that is greater than the associated speed limit should have a relatively higher associated motion-cost.

The collision-cost is a cost element added as a result of a probability of an anticipated collision with other vehicles, pedestrians, and/or on-road obstacles, such as broken tires, sandbags, etc. A collision with a pedestrian should be avoided by all means and hence will have the highest associated collision-cost. A collision with another vehicle may have the next highest associated collision-cost. A collision with an on-road obstacle may have the next highest associated collision-cost. The collision-costs may be set such that a set of motions that avoids any collision will be chosen over a set of motions that requires a collision. In the event two sets of motions are presented that each include a collision (i.e., a collision is unavoidable) the collision-costs may be set such that a set of motions that includes a collision with an on-road obstacle, such as a sandbag, may be chosen over a set of motions that includes a collision with a pedestrian or a collision with another vehicle.

The inference module 46 calculates a total cost for each of the potential sets of motions associated with each of the potential trajectories for traveling along the received route based on the following formula:

$$\text{total cost} = \text{cost-to-goal} + \text{sum(motion-cost(s))} + \text{collision-cost} + \text{inferred-cost}, \quad (1)$$

where the cost-to-goal, the motion-cost(s), and the collision-cost are described above, and the inferred-cost is determined by the inference module 46, as described below. The term "sum(motion-cost(s))" refers to the summation of all motion-costs associated with the particular set of motions, as described above.

The inference module 46 can selectively increase or decrease the inferred-cost term based on the dynamic obstacles data 56 from the perception system 50 and data from the V2X system 24 (if present). In this way, the inference module 46 can selectively increase or decrease the total cost for the set of motions for traveling along the route received from the global route planner module 42 based on the inferred or implied information about the environment of the self-driving vehicle 10. For example, the inference module 46 may determine the inferred-cost term based on a probability (P) of the cost multiplied by a predetermined constant term. For example, the inferred-cost term may be initialized based on a predetermined probability distribution, such as:

$$P(\text{inferred-cost is high value}) = 0.05, \text{ or} \quad (2)$$

$$P(\text{inferred-cost is low value}) = 0.95, \quad (3)$$

with the high value being an inferred cost associated with an obstacle, such as a broken tire or dead animal, lying in the path of the self-driving vehicle and the low value being associated with the path being clear of such obstacles. In other words, at initialization and without further information, the inference module 46 may assume that the probability of a broken tire or dead animal blocking the path of the self-driving vehicle 10 is relatively low.

During operation, the inference module 46 may then receive information about the dynamic environment of the self-driving vehicle 10. For example, as discussed above, the inference module 46 may receive dynamic obstacles data 56 from the perception system 50 and data from the V2X system 24 (if present). Once the behavior of other dynamic obstacles in the environment is observed, the inference module 46 may then update the probabilities using Bayes rule, based on predetermined likelihood functions. For example, the inference module 46 may observe information about preceding vehicles changing lanes in front of the self-driving vehicle 10, and may adjust the probabilities based on the following:

$$P(\text{preceding vehicle changes lane} | \text{inferred-cost is high}) = 0.9, \quad (4)$$

$$P(\text{preceding vehicle remains in current lane} | \text{inferred-cost is high}) = 0.1, \quad (5)$$

$$P(\text{preceding vehicle changes lane} | \text{inferred-cost is low}) = 0.3, \text{ or} \quad (6)$$

$$P(\text{preceding vehicle remains in current lane} | \text{cost is low}) = 0.7. \quad (7)$$

Based on the above probabilities, the inference module 46 may then calculate a posterior probability of:

$$\text{posterior } P(\text{inferred-cost is high} | \text{preceding vehicle changes lane}). \quad (8)$$

In other words, the inference module 46 may calculate the posterior probability of the inferred-cost being high based on the observed behavior of dynamic objects, such as a preceding vehicle changing lanes, in the environment of the self-driving vehicle 10. While the above example is given for the observation of whether a preceding vehicle changes lanes, the inference module 46 can make similar calculations based on other observed behavior of dynamic objects, such as other traffic participants, other vehicles, pedestrians, cyclists, animals, etc. Once the posterior probability of the inferred-cost being high is calculated, the inference module 46 calculates the inferred-cost accordingly based on the calculated posterior probability and the predetermined constant.

Once the inference module 46 calculates the inferred-costs and adjusted total costs for the different sets of motions associated with the different potential trajectories for traveling along the route received from the global route planner module 42, the inference module 46 outputs the adjusted total costs for each of the different sets of motions to the motion planner module 48. The motion planner module 48 receives the route and the adjusted total costs for the different sets of motions associated with the different potential trajectories for traveling along the route from the inference module 46. The motion planner module 48 also receives vehicle information from the vehicle information database 30 and motion primitive information from the motion primitive database 32. The motion planner module 48 also receives dynamic obstacles data 56, static obstacles data 58, and road geometry data 60 from the perception system 50. The motion planner module 48 also receives localization/inertial data 54 from the perception system 50. Based on the vehicle information, motion primitive information, traffic rules, dynamic obstacles data 56, static obstacles data 58, road geometry data 60, and localization/inertial data 54, the motion planner module 48 selects a set of motions for the self-driving vehicle to execute for a particular trajectory for traveling along the received route. For example, the potential sets of motions for the self-driving vehicle may include a set of motions for continuing forward in the current lane of travel and a set of motions for changing lanes to the left, with each set of motions having an associated adjusted total cost. The motion planner module 48 may select a set of motions, based on the received information and the associated adjusted total costs, and generate a smooth trajectory for the self-driving vehicle 10 to follow over a predetermined time period. For example, the predetermined time period may be 30 seconds, although other predetermined time periods may be used. The smooth trajectory, for example, may consist of a sequence of one or more motion primitives selected for the self-driving vehicle 10 from the motion primitive database 32. The motion planner module 48 then outputs the determined smooth trajectory to the trajectory follower module 62.

The trajectory follower module 62 receives the smooth trajectory from the motion planner module 48 and controls the vehicle actuation systems 66 so that the self-driving vehicle 10 follows the determined smooth trajectory. In other words, the trajectory follower module 62 appropriately controls the steering system 12, the throttle system 14, and the braking system 16 so that the self-driving vehicle 10 follows the determined smooth trajectory outputted by the motion planner module 48.

Figure 3:
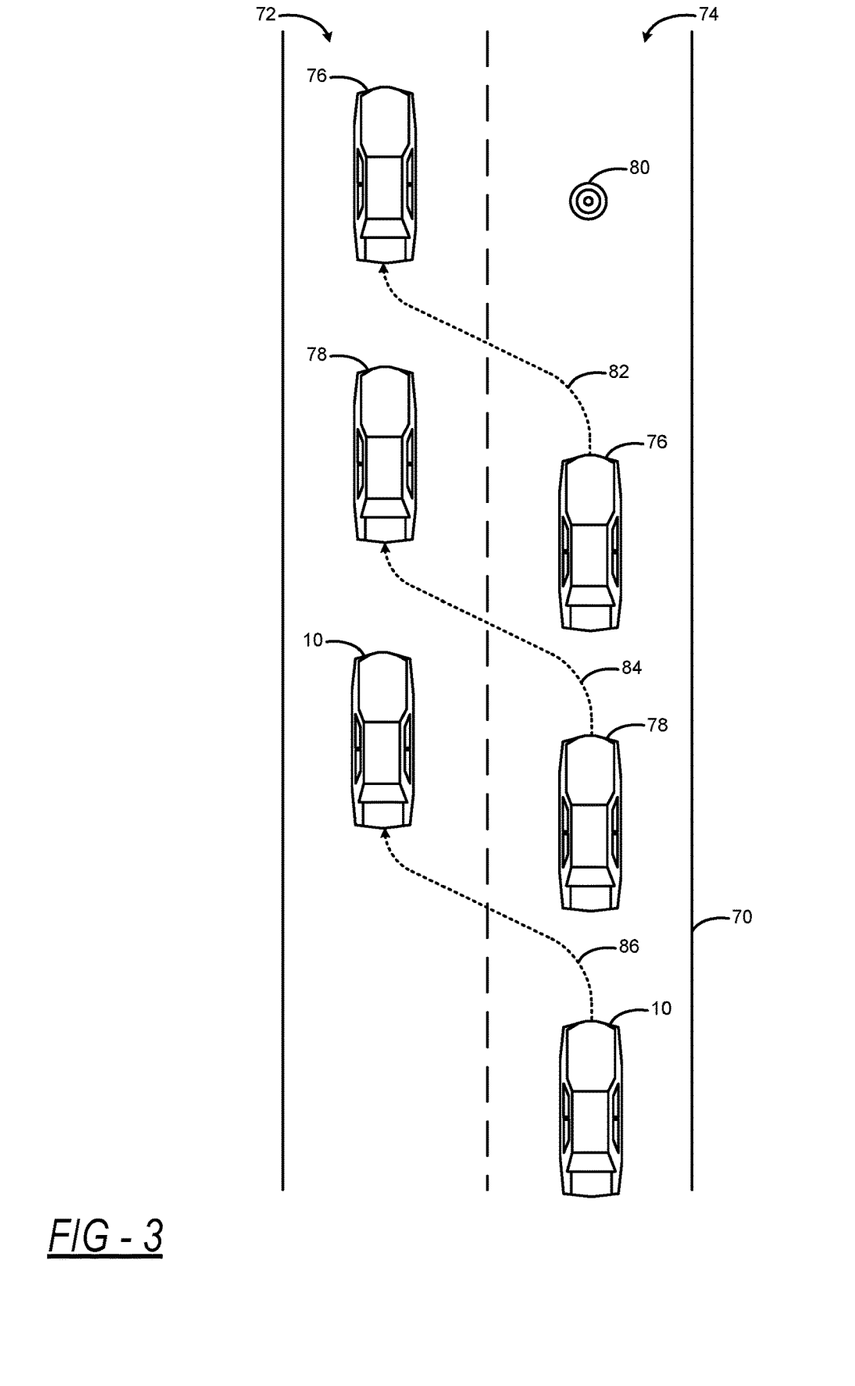
FIG. 3 illustrates a traffic scenario with a vehicle using the system for inference-aware motion planning according to the present teachings.

An example operation of the inference-aware motion planning system of the present teachings is described with reference to FIG. 3. In FIG. 3, the self-driving vehicle 10 is traveling in a right lane 74 of a road 70 that also includes a left lane 72. A first secondary vehicle 76 and a second secondary vehicle 78 are also traveling in the right lane 74 of the road 70. An obstacle 80, such as a tire, is located in the right lane 74 ahead of the first secondary vehicle 76. The self-driving vehicle 10 may be traveling on a route that includes a first path corresponding to the right lane 74 of the road 70 and a second path that corresponds to the left lane 72 of the road 70. In this example, both the left lane 72 and the right lane 74 may lead to the same ultimate destination location. As the first secondary vehicle 76 approaches the obstacle, the first secondary vehicle 76 changes lanes to the left to avoid the obstacle 80, as shown by arrow 82. At this point, the self-driving vehicle 10 may not directly observe the obstacle 80 with its vehicle sensors 22. The self-driving vehicle 10 may, however, observe the first secondary vehicle 76 change lanes to the left, as indicated by arrow 82. At this point, the planning system 20, and specifically the inference module 46, may increase the inferred-cost and, consequently, the total cost associated with traveling in the right lane 74 of the road 70. Based on the increased cost of the traveling in the right lane 74, the planning system 20 of the self-driving vehicle 10 may decide to change lanes to the left lane 72, as indicated by arrow 86. Alternatively, based on the other cost values, the self-driving vehicle 10 may continue to travel in the right lane 74 with the increased associated total cost. The self-driving vehicle 10 may then observe the second secondary vehicle 78 change lanes to the left lane 72 as indicated by arrow 84, but may not yet directly observe the obstacle 80 in the right lane 74. At this point, the planning system 20, and specifically the inference module 46, may again increase the inferred-cost and the associated total cost of traveling in the right lane 74 of the road 70. With both preceding vehicles, i.e., the first secondary vehicle and the right secondary vehicle, having changed lanes to the left lane 72, the self-driving vehicle 10, and specifically the planning system 20 and the inference module 46, may determine that there is an increased probability of an obstacle 80 being located in the right lane 74 even though the self-driving vehicle 10 has not yet directly observed the obstacle 80. At this point, based on the additional increased cost of traveling in the right lane 74, the planning system 20 of the self-driving vehicle 10 may then decide to change lanes to the left lane 72, as indicated by arrow 86.

Figure 4:
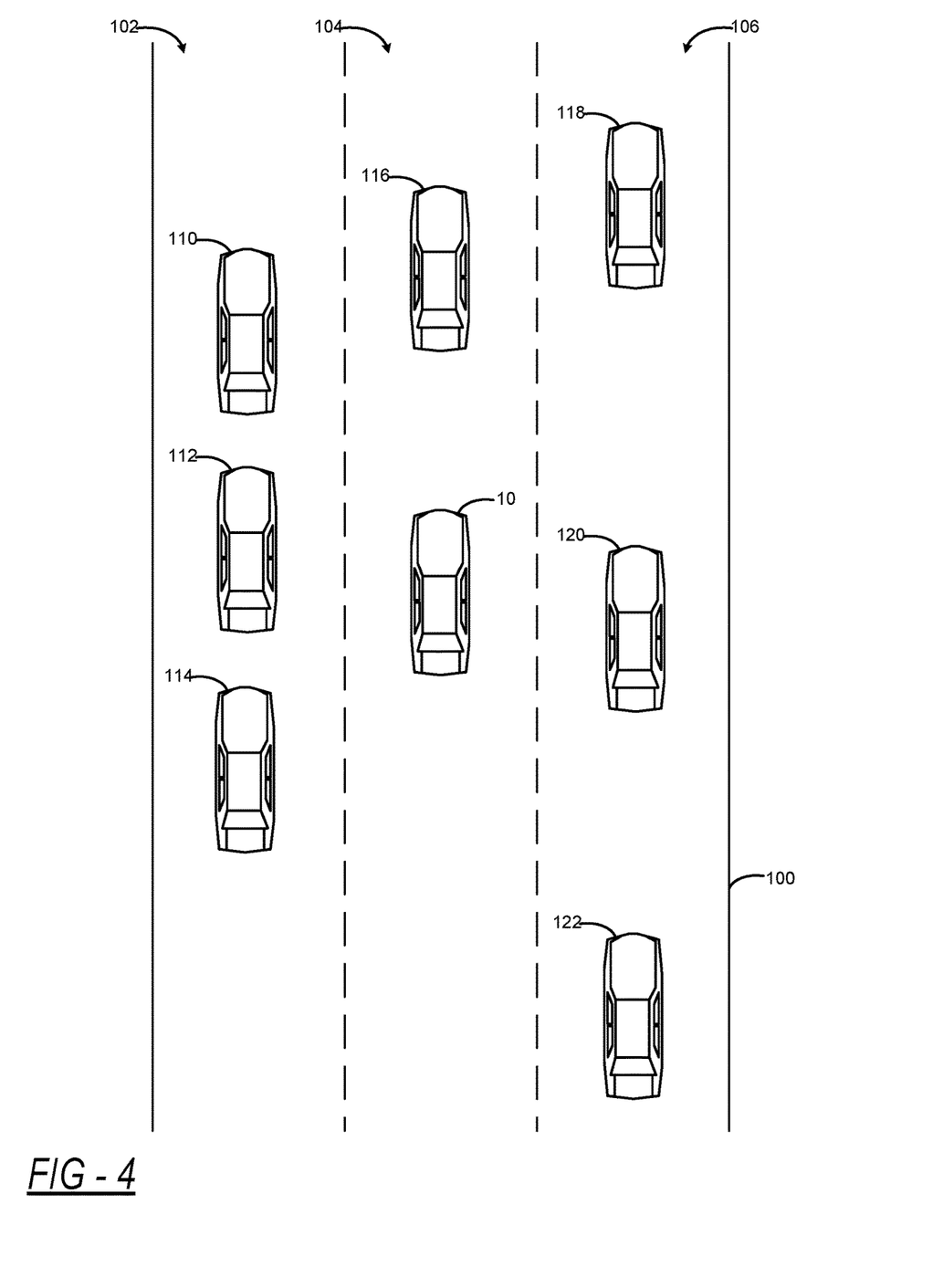
FIG. 4 illustrates another traffic scenario with a vehicle using the system for inference-aware motion planning according to the present teachings.

Another example operation of the inference-aware motion planning system of the present teachings is described with reference to FIG. 4. In FIG. 4, the self-driving vehicle 10 is traveling in a middle lane 104 of a road 100 that also includes a left lane 102 and a right lane 106. A first secondary vehicle 110, a second secondary vehicle 112, and a third secondary vehicle 114 are traveling in the left lane 102 of the road 100. A fourth secondary vehicle 116 is traveling in a middle lane 104 of the road 100. A fifth secondary vehicle 118, a sixth secondary vehicle 120, and a seventh secondary vehicle 122 are traveling in the right lane 106 of the road 100. The self-driving vehicle 10 may be traveling on a route that includes a first path corresponding to the middle lane 104, a second path corresponding to the left lane 102, and a third path corresponding to the right lane 106. In this example, the left lane 102, the middle lane 104, and the right lane 106 may lead to the same ultimate destination location. Initially, the total cost for traveling in the left lane 102, the middle lane 104, and the right lane 106 may be approximately equal. The vehicle sensors 22 of the self-driving vehicle 10 may observe, however, that the secondary vehicles 110, 112, 114 traveling in the left lane 102 are moving slower than the secondary vehicle 116 and the self-driving vehicle 10, traveling in the middle lane 104 and even slower than the secondary vehicles 118, 120, 122 traveling in the right lane 106. The vehicles sensors 22 of the self-driving vehicle 10 may further observe that the secondary vehicles 118, 120, 122 in the right lane are traveling faster than the secondary vehicle 116 and self-driving vehicle 10 traveling in the middle lane 104 and even faster than the secondary vehicles 110, 112, 114 traveling in the left lane. At this point, the planning system 20, and specifically the inference module 46, may increase the inferred-cost and, consequently, the total cost, associated with traveling in the left lane 102 of the road 100. Similarly, the planning system 20, and specifically the inference module 46, may decrease the inferred-cost and, consequently, the total cost, associated with traveling in the right lane 106 of the road 100. Based on the decreased cost associated with traveling in the right lane 106, the planning system 20 of the self-driving vehicle 10 may decide to change lanes to the right lane 106, once it is safe to change lanes, to travel in a faster lane.

Figure 5:
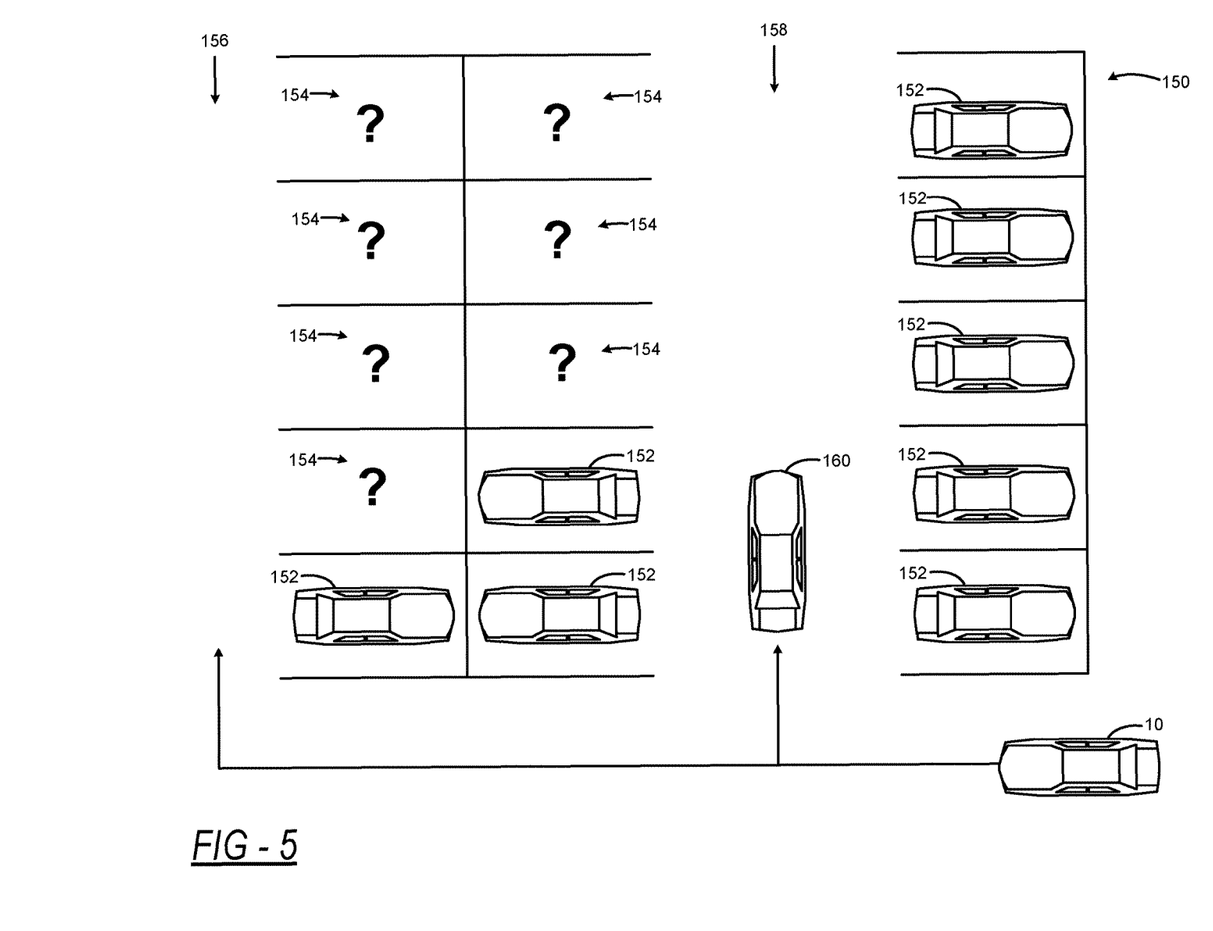
FIG. 5 illustrates a parking scenario with a vehicle using the system for inference-aware motion planning according to the present teachings.

Another example operation of the inference-aware motion planning system of the present teachings is described with reference to FIG. 5. In FIG. 5, the self-driving vehicle 10 is traveling in a parking lot 150 that includes a number of already parked vehicles. In particular, the vehicle sensors 22 of the self-driving vehicle 10 may be able to directly observe the already parked vehicles 152 in the parking lot. The parking lot 150 may also include a number of parking spots 154 that the vehicle sensors 22 and the self-driving vehicle 10 cannot directly observe. In other words, the vehicle sensors 22 and the self-driving vehicle 10 cannot directly observe whether vehicles are already parked in the parking spots 154, which may or may not be occupied with parked vehicles. As shown in FIG. 5, the parking lot 150 includes a first lane 156 and a second lane 158. Initially, the costs associated with traveling in the first lane 156 and traveling in the second lane 158 may be approximately equal. The vehicle sensors 22 of the self-driving vehicle 10 may observe a secondary vehicle 160 turning and traveling down the second lane 158. Given that an available parking spot in the second lane 158 may be taken by the secondary vehicle 160, the planning system 20, and specifically the inference module 46, may increase the inferred-cost and, consequently, the total cost, associated with the second lane 158. Additionally or alternatively, the planning system 20, and specifically the inference module 46, may decrease the inferred-cost and, consequently, the total cost, associated with the first lane 156. As such, as between the first lane 156 and the second lane 158, the planning system 20 of the self-driving vehicle 10 may choose to travel to the first lane 156 to look for an available parking spot.

Figure 6:
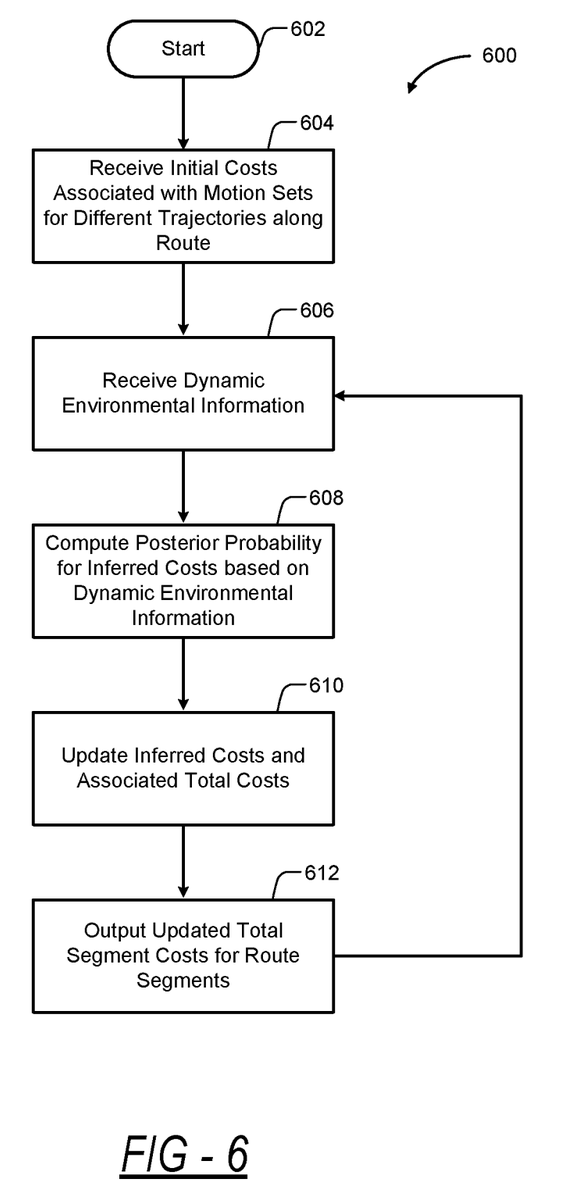
FIG. 6 illustrates a flow diagram for a method of inference-aware motion planning according to the present teachings.

With reference to FIG. 6, a flow diagram of an algorithm 600 for inference aware motion planning is shown. The algorithm 600, for example, can be performed by the inference module 46 of the planning system 20 to adjust the total costs associated with different sets of motions associated with different trajectories for traveling along the route outputted by the global route planner module 42 of the planning system 20. The algorithm starts at 602. At 604, the inference module 46 receives the route from the global route planner module 42 and receives the initial associated costs for the different sets of motions associated with different trajectories for traveling along the route. The initial associated costs include, for example, the cost-to-goal, the motion-cost(s), and the collision-cost values, as described in detail above. At 606, the inference module 46 receives dynamic environmental information about the surroundings of the self-driving vehicle. For example, the inference module 46 can receive dynamic obstacles data 56 from the perception system 50 based on data received from vehicle sensors 22, as described in detail above. In addition, the inference module 46 may receive data from a V2X system 24, if present, as described in detail above.

At 608, the inference module 46 computes the posterior probability for the inferred costs of the sets of the motions associated with the different trajectories for traveling along the route received from the global route planner module 42, based on the dynamic environmental information, as described in detail above. At 610, the inference module 46 updates the inferred costs and resulting total costs for each set of motions associated with the different trajectories for traveling along the route received from the global route planner module 42, as described in detail above. At 612, the inference module 46 outputs the updated total costs for each of the sets of motions for traveling along the route received from the global route planner module 42 to the motion planner module 48, as discussed in detail above. The inference module 46 then loops back to 606 and receives additional dynamic environmental information, as discussed in detail above.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

In this application, including the definitions below, the terms "module" and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules and systems described herein. In addition, in this application the terms "module" and "system" may be replaced with the term "circuit."

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
    a vehicle having at least one vehicle actuation system and at least one vehicle sensor, the at least one vehicle actuation system including at least one of a steering system, a braking system, and a throttle system, and the at least one vehicle sensor including at least one of a vehicle speed sensor, a vehicle acceleration sensor, an image sensor, a Lidar sensor, a radar sensor, a stereo sensor, an ultrasonic sensor, a global positioning system, and an inertial measurement unit;
    a perception system that generates dynamic obstacles data based on information received from the at least one vehicle sensor, the dynamic obstacles data including at least one of a current location, a size, a current estimated trajectory, a current estimated velocity, and a current estimated acceleration/deceleration of an object;
    a planning system having at least one processor and at least one memory storing computer-executable instructions that, when executed by the at least one processor, configure the at least one processor to implement a global route planner module, an inference module, a motion planner module, and a trajectory follower module, wherein:
    the global route planner module receives an inputted destination and generates a route to the inputted destination;
    the inference module receives the route from the global route planner module and the dynamic obstacles data from the perception system and determines a total cost for each set of motions of a plurality of sets of motions associated with different trajectories for traveling along the received route, the total cost including at least one associated cost and an inferred cost for the associated set of motions, the inferred cost being based on a probability of the associated set of motions having an increased or decreased cost based on the dynamic obstacles data;
    the motion planner module receives the total cost for each set of motions of the plurality of sets of motions, selects a particular set of motions from the plurality of sets of motions based on the total cost for each set of motions, and generates a smooth trajectory for the vehicle; and
    the trajectory follower module controls the at least one vehicle actuation system based on the smooth trajectory.

2. The system of claim 1, wherein the inference module generates a posterior probability of the inferred cost being high based on the dynamic obstacles data.

3. The system of claim 1, wherein the dynamic obstacles data indicates that at least one preceding vehicle to the vehicle is changing lanes or has changed lanes from a current lane of travel to another lane and wherein the inference module increases the inferred cost associated with the set of motions for traveling in the current lane of travel based on the dynamic obstacles data indicating that the at least one preceding vehicle is changing lanes or has changed lanes.

4. The system of claim 1, wherein the dynamic obstacles data indicates that vehicles in a first lane of travel are traveling faster than vehicles in a second lane of travel and wherein the inference module performs at least one of increasing the inferred cost for a first set of motions associated with the first lane of travel and decreasing the inferred cost for a second set of motions associated with the second lane of travel based on the dynamic obstacles data indicating that vehicles in the first lane of travel are traveling faster than vehicles in the second lane of travel.

5. The system of claim 1, wherein the dynamic obstacles data indicates that a secondary vehicle is traveling in a first lane of a parking lot and wherein the inference module performs at least one of increasing the inferred cost for a set of motions associated with the first lane of the parking lot and decreasing the inferred cost for a set of motions associated with a second lane of the parking lot based on the dynamic obstacles data indicating that the secondary vehicle is traveling in the first lane of the parking lot.

6. The system of claim 1, wherein the at least one associated cost for each set of motions includes a cost-to-goal based on at least one of a total distance to the inputted destination and a total estimated travel time to the inputted destination.

7. The system of claim 1, wherein the at least one associated cost for each set of motions includes a sum of a plurality of motion-costs associated with the associated set of motions.

8. The system of claim 1, wherein the at least one associated cost for each set of motions includes a collision-cost based on a probability of an anticipated collision.

9. The system of claim 1, further comprising a communication system configured to communicate with at least one of another vehicle, a cloud computing device, and an infrastructure location having an associated communication system, wherein the inference module receives information from the communication system and additionally determined the inferred cost based on the information from the communication system.

10. A method comprising:
   receiving, with a planning system of a vehicle, an inputted destination, the vehicle having at least one vehicle actuation system and at least one vehicle sensor, the at least one vehicle actuation system including at least one of a steering system, a braking system, and a throttle system and the at least one vehicle sensor including at least one of a vehicle speed sensor, a vehicle acceleration sensor, an image sensor, a Lidar sensor, a radar sensor, a stereo sensor, an ultrasonic sensor, a global positioning system, and an inertial measurement unit, the planning system including at least one processor and at least one memory storing computer-executable instructions that, when executed by the at least one processor, configure the at least one processor to implement a global route planner module, an inference module, a motion planner module, and a trajectory follower module;
   generating, with the global route planner module, a route to the inputted destination;
   generating, with a perception system, dynamic obstacles data based on information received from the at least one vehicle sensor, the dynamic obstacles data including at least one of a current location, a size, a current estimated trajectory, a current estimated velocity, and a current estimated acceleration/deceleration of an object;
   receiving, with an inference module of the planning system, the route from the global route planner module and the dynamic obstacles data from the perception system;
   determining, with the inference module, a total cost for each set of motions of a plurality of sets of motions associated with different trajectories for traveling along the received route, the total cost including at least one associated cost and an inferred cost, the inferred cost being based on a probability of the set of motions having an increased or decreased cost based on the dynamic obstacles data;
   receiving, with a motion planner module of the planning system, the total cost for each set of motions;
   selecting, with the motion planner module, a particular set of motions from the plurality of sets of motions based on the total cost for each set of motions;
   generating, with the motion planner module, a smooth trajectory for the vehicle based on the particular set of motions; and
   controlling, with a trajectory follower module of the planning system, the at least one vehicle actuation system based on the smooth trajectory.

11. The method of claim 10, further comprising generating, with the inference module, a posterior probability of the inferred cost being high based on the dynamic obstacles data.

12. The method of claim 10, wherein the dynamic obstacles data indicates that at least one preceding vehicle to the vehicle is changing lanes or has changed lanes from a current lane of travel to another lane, the method further comprising increasing, with the inference module, the inferred cost associated with the set of motions for traveling in the current lane of travel based on the dynamic obstacles data indicating that the at least one preceding vehicle is changing lanes or has changed lanes.

13. The method of claim 10, wherein the dynamic obstacles data indicates that vehicles in a first lane of travel are traveling faster than vehicles in a second lane of travel, the method further comprising performing, with the inference module, at least one of increasing the inferred cost for a first set of motions associated with the first lane of travel and decreasing the inferred cost for a second set of motions associated with the second lane of travel based on the dynamic obstacles data indicating that vehicles in the first lane of travel are traveling faster than vehicles in the second lane of travel.

14. The method of claim 10, wherein the dynamic obstacles data indicates that a secondary vehicle is traveling in a first lane of a parking lot, the method further comprising performing at least one of increasing the inferred cost for a first set of motions associated with the first lane of the parking lot and decreasing the inferred cost for a second set of motions associated with a second lane of the parking lot based on the dynamic obstacles data indicating that the secondary vehicle is traveling in the first lane of the parking lot.

15. The method of claim 10, wherein the at least one associated cost for each set of motions includes a cost-to-goal based on at least one of a total distance to the inputted destination and a total estimated travel time to the inputted destination.

16. The method of claim 10, wherein the at least one associated cost for each set of motions includes a sum of a plurality of motion-costs associated with the associated set of motions.

17. The method of claim 10, wherein the at least one associated cost for each set of motions includes a collision-cost based on a probability of an anticipated collision.

18. The method of claim 10, further comprising:
   receiving information with a communication system configured to communicate with at least one of another vehicle, a cloud computing device, and an infrastructure location having an associated communication system; and
   determining, with the inference module, the inferred cost based on the information from the communication system.

19. A system comprising:
   a vehicle having a plurality of vehicle actuation systems and a plurality of vehicle sensors, the plurality of vehicle actuation systems including a steering system, a braking system, and a throttle system and the plurality of vehicle sensors including a global positioning system and inertial measurement unit and at least one of a vehicle speed sensor, a vehicle acceleration sensor, an image sensor, a Lidar sensor, a radar sensor, a stereo sensor, and an ultrasonic sensor;
   a map database storing map data for a geographic area in which the vehicle is traveling;
   a vehicle information database storing vehicle information indicating at least one of a vehicle model, a vehicle size, a vehicle wheelbase, a vehicle mass, and a vehicle turning radius of the vehicle;
   a motion primitive database storing a listing of motion primitives, each corresponding to a discretized smooth path that can be traversed by the vehicle over a predetermined time interval;
   a traffic rules database storing traffic rules associated with the geographic area in which the vehicle is traveling;
   a communication system configured to communicate with at least one other vehicle and receive information related to at least one of a warning of an accident, a driving hazard, an obstacle, a traffic pattern, a location of the at least one other vehicle, a traffic signal location, and a traffic signal timing;

a perception system configured to generate dynamic obstacles data, static obstacles data, and road geometry data based on information received from the plurality of vehicle sensors, the dynamic obstacles data including at least one of a current location, a size, a current estimated trajectory, a current estimated velocity, and a current estimated acceleration/deceleration of an object, the static obstacles data including information about static obstacles, and the road geometry data including information about a road that the vehicle is traveling on;

a planning system having at least one processor and at least one memory storing computer-executable instructions that, when executed by the at least one processor, configure the at least one processor to implement a global route planner module, an inference module, a motion planner module, and a trajectory follower module, wherein:

the global route planner module receives an inputted destination and generates a route to the inputted destination based on the map data from the map database and based on traffic information from the global positioning system and inertial measurement unit;

the perception system generates localization/inertial data corresponding to a current location and orientation of the vehicle based on information received from the plurality of vehicle sensors;

the inference module receives the route from the global route planner module, the dynamic obstacles data from the perception system, and the information from the communication system, and determines a total cost for each set of motions of a plurality of sets of motions associated with different trajectories for traveling along the route based on at least one associated cost and an inferred cost for each set of motions, the inferred cost being based on a probability of the associated set of motions having an increased or decreased cost based on the dynamic obstacles data and based on the information from the communication system;

the planning system (i) receives the total cost for each set of motions of the plurality of motions, the map data from the map database, the vehicle information from the vehicle information database, the listing of motion primitives from the motion primitive database, the traffic rules from the traffic rules database, the information from the communication system, the dynamic obstacles data from the perception system, the static obstacles data from the perception system, the road geometry data from the perception system, and localization/inertial data from the perception system, (ii) selects a particular set of motions from the plurality of sets of motions based on the total cost for each set of motions, and (iii) generates a smooth trajectory for the vehicle based on the particular set of motions; and the trajectory follower module controls the plurality of vehicle actuation system based on the smooth trajectory.

* * * * *

UNITED STATES PATENT AND TRADEMARK OFFICE
CERTIFICATE OF CORRECTION

PATENT NO. : 10,074,279 B1
APPLICATION NO. : 15/451957
DATED : September 11, 2018
INVENTOR(S) : Yunfei Xu et al.

Page 1 of 1

It is certified that error appears in the above-identified patent and that said Letters Patent is hereby corrected as shown below:

On the Title Page

Column 1, item (22) Filed, Line 1, After "2017", insert --¶(65) Prior Publication Data US 2018/0261093 A1 Sep. 13, 2018--

Signed and Sealed this
Twenty-eighth Day of May, 2019

Andrei Iancu
*Director of the United States Patent and Trademark Office*